United States Patent [19]

Fujimoto

[11] Patent Number: 4,702,704
[45] Date of Patent: Oct. 27, 1987

[54] TETRAHEDRAL CODON STEREO-TABLE
[75] Inventor: Manabu Fujimoto, Kyoto, Japan
[73] Assignee: Shionogi & Co., Ltd., Osaka, Japan
[21] Appl. No.: 776,693
[22] Filed: Sep. 16, 1985
[30] Foreign Application Priority Data
  Sep. 19, 1984 [JP]  Japan .................. 59-197537
[51] Int. Cl.⁴ ............................................. G09B 23/00
[52] U.S. Cl. ................................................. 434/295
[58] Field of Search ............... 434/98, 135, 295, 279,
  434/276, 279, 281, 282, 298, 403, 208, 211;
  283/1 A

[56] References Cited
  U.S. PATENT DOCUMENTS
  2,393,676  1/1946  Fuller .............................. 434/135
  4,207,580  6/1980  Lyons .......................... 283/1 A X
  4,211,016  7/1980  Eldar ................................ 434/98

FOREIGN PATENT DOCUMENTS
  42695  12/1981  European Pat. Off. ......... 273/153 S OTHER PUBLICATIONS
Fox et al, Cell, vol. 26, pp. 315-323 (1981).
Barrell et al, Proc. Natl. Acad. Sci. USA, vol. 77, No. 6, pp. 3164-3166 (1980).

Primary Examiner—William H. Grieb
Attorney, Agent, or Firm—Birch, Stewart, Kolasch and Birch

[57] ABSTRACT

A tetrahedral stereo-table is disclosed for 64 DNA and/or RNA codons. The table comprises its tetrehedral 4 faces each divided into 16 codon phases for the representation of the respective codon triplets plus the 21 teams of 20 L-amino acids and one triphasic termination team O. Such a representation can be realized with alphabet characters and/or coloration for the triplets and teams. The triplets are alternatively represented by ideograms having no alphabetic orientation in addition to the team coloration. Said tetrahedral 4 faces may be transcribed over the surface of a sphere.

14 Claims, 4 Drawing Figures

TETRAHEDRAL CODON STEREO-TABLE

BACKGROUNDS OF THE INVENTION

1. Field of the Invention

This invention relates to a novel tetrahedral codon stereo-table which points out a better arrangement of DNA/RNA codons and it is highly useful in the field of genetic engineering. The stereo-table is an instructive tool for effective learning about the natural codon system, the corresponding L-amino acid sequence and the like.

2. Description of the Prior Art

It is well-known that progress in genetic engineering is remarkable as can be seen by gene manipulation. The technique thereof has been widely and practically available in the fields of medicine, foods, new living forms and the like. The importance of a codon system and a genetic mechanism must be emphasized. Learning about the codon system or genetic engineering is now indispensable for every scientist who engages in biology or biotechnology as well as for government officers or environmentalists.

Heredity is derived from the fact that proper amino acids, peptides and proteins are systematically connected and duly taken into living bodies. Genetic information is exactly inherited from ancestors to the descendant, because an organism is duly shared with the proper genes of the ancestors. Mechanism of polypeptide formation is now examined on a bio-molecular level, i.e. transcription of ribonucleic acid (RNA) from the corresponding deoxyribonucleic acid (DNA) inherent in the organism, successive connection of amino acids and formation of proper polypeptide chain in the proper order. In brief, heridity of an organism starts from DNA functions of the ancestors. Such a gene code is transmitted and controlled by the sequential DNA chains with 20 kinds of L-amino acids, the function of resultant peptide chain, a three-dimensional structure of protein and the like, so that every arrangement of three consecutive nucleotides (gene triplet) can be translated into an action program to run or terminate the connection of one L-amino acid at the peptide terminal. Amino acids are connected one by one through the RNA code to form the necessary polypeptide chain in the due order inherited. DNA nucleotides are connected with a phosphate chain of 4 nucleosides, i.e. adenosine (A), cytidine (C), guanosine (G) and thymidine (T), while RNA nucleosides consist of A, C, G and uridine (U) instead of DNA's T.

There are $4^3 = 64$ phases of the gene triplets, because the 3 nucleotides for one triplet can be arbitrarily selected thrice from the 4 kinds of DNA/RNA nucleotides. Natural 20 L-amino acids are expressed by their codon teams having one to six phases. The relationship between said codons and the corresponding L-amino acids has been traditionally shown only by the attached table.

TABLE

64 RNA Codons and the Corresponding 20 Amino Acids

|   | U |   | C |   | A |   | G |   |
|---|---|---|---|---|---|---|---|---|
| U | UUU | Phe | UCU |  | UAU | Tyr | UGU | Cys |
|   | UUC | (F) | UCC | Ser | UAC | (Y) | UGC | (C) |
|   | UUA | Leu | UCA | (S) | UAA | Ocher | UGA | Opal |
|   | UUG | (L) | UCG |  | UAG | Amber | UGG | Trp(W) |
| C | CUU |  | CCU |  | CAU | His | CGU |  |
|   | CUC | Leu | CCC | Pro | CAC | (H) | CGC | Arg |
|   | CUA | (L) | CCA | (P) | CAA | Gln | CGA | (R) |
|   | CUG |  | CCG |  | CAG | (Q) | CGG |  |
| A | AUU |  | ACU |  | AAU | Asn | AGU | Ser |
|   | AUC | Ile | ACC | Thr | AAC | (N) | AGC | (S) |
|   | AUA | (I) | ACG | (T) | AAA | Lys | AGA | Arg |
|   | AUG | Met(M) | ACG |  | AAG | (K) | AGG | (R) |
| G | GUU |  | GCU |  | GAU | Asp | GGU |  |
|   | GUC | Val | GCC | Ala | GAU | (D) | GGC | Gly |
|   | GUA | (V) | GCA | (A) | GAA | Glu | GGA | (G) |
|   | GUG |  | GCG |  | GAG | (E) | GGG |  |

Such a traditional RNA table, however, has a lot of drawbacks in learning. While three L-amino acids, leucine (abbreviated as Leu/L), arginine (Arg/R) and serine (Ser/S) are expressed each by the respective codon hexaphases, the phase allocations seem quite irregular in the table. It is least convenient or serving for genetic scientists to learn about or contemplate an updated gene mechanism. When learners wish to apply said table to DNA codon system, they have to convert RNA uridine (U) into DNA thymidine (T) during their studying or thinking.

SUMMARY OF THE INVENTION

It is the first object of this invention to provide for a new type of DNA/RNA codon table.

The second object of this invention is to prepare for a tetrahedral stereo-table of DNA/RNA codons free from inconvenience in learning with the traditional table.

The third object of this invention is to supply with a stereo-table which can simultaneously point out the corresponding L-amino acids in addition to the triplets. Such a stereo-table is instructive for learning about the functions of gene code and the full meaning between a codon and the corresponding amino acid.

It is the fourth object of this invention to provide for a stereo-table which contains ideographic presentations of DNA/RNA codons in lieu of or in addition to the alphabet characters of triplets in order to give genetic researchers a great deal of suggestion for selecting their biotechnological works.

DESCRIPTION OF THE INVENTION

According to this invention, a tetrahedral codon stereo-table is provided, which comprises tetrahedral 4 faces each divided into 16 phases. Every face of the tetrahedron covers with a full representation of the 64 triplets, the corresponding amino acids and the triphasic termination team.

Codon 64 phases are allocated one by one to 4×16 equivalent small-triangles. Each phase may alternatively have a different shape and/or area to point out its functional properties. The phase of triple-letter codon such as AAA, CCC, GGG or TTT/UUU is preferably allocated to the top or center phase on the face A, C, G or T/U, respectively. The 20 L-amino acids can be represented by either a new single-letter code or a series of characteristic coloration. The 64 triplets can be represented by alphabet characters and/or ideograms.

BRIEF DESCRIPTION OF THE DRAWINGS

In the following paragraphs, this invention is described in more concrete detail by way of examples as illustrated in the attached Figures.

FIG. 1 is a top triple-letter setting (abbreviated as top-setting) for RNA codons, FIG. 2 of a center triple-letter setting (abbreviated as center-setting) for DNA/RNA codons and FIG. 3 of another center-setting for DNA condons having different and unequal shapes and areas

DETAILED DESCRIPTION OF PREFERRED EMBODIMENTS

EXAMPLE 1

Figure 1:
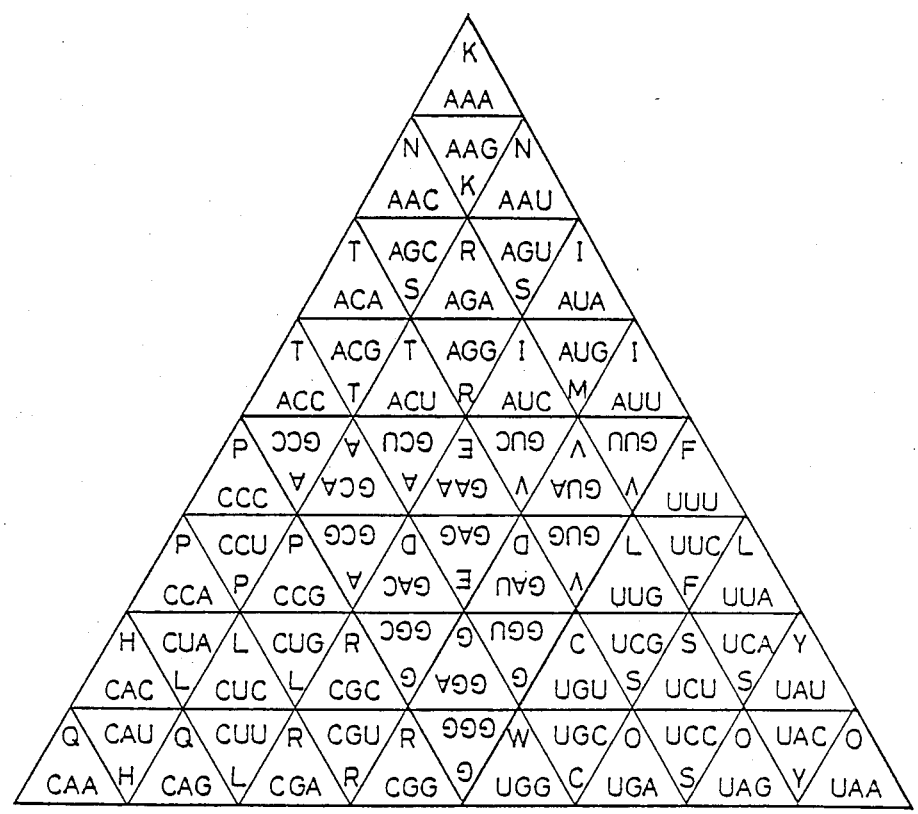
FIGS. 1, 2 and 3 each disclose an unfolded view of an embodiment of the tetrahedral codon stereo-table designed in accordance with this invention.

In accordance with this invention, FIG. 1 is an unfolded view of an embodiment of the codon stereo-table wherein tetrahedral 4 faces are designed for pointing out RNA triplets and the corresponding amino acids. In this example, these 64 triplets as well as the corresponding 21 teams of 20 L-amino acids and one termination team by a single-letter code are allocated to the respective phases on every face. All the alphabet characters are written on the tetrahedral 4 faces so that they are readable in their upright postures. All the triple-letter codons, i.e. of four phases AAA, CCC, GGG and UUU, are allocated to the top phase of every tetrahedral face. Each face is equivalently framed by 16 small-triangular phases so that this example can be seen as a type of top-setting.

An AA middle-triangle is composed of 4 phases of AAA, AAC, AAG and AAU, occupying one fourth area of face A at the head. The triple-letter phase AAA is allocated at the top, while the phases AAC, AAG and AAU are at bottom-left, center and bottom-right phases of the AA middle-triangle, respectively. Remaining phases can be systematically allocated with the 4 characters A, C, G and U so that the more number of the same nucleotide character A, C, G or U be allocated to the nearer phase to the triple-letter phase AAA, CCC, GGG or UUU, respectively.

An AC middle-triangle is to be allocated at bottom-left area of face A while other 2 middle-triangles AG and AU be allocated at the center and the bottom-right, respectively. The respective 4 phases on these 3 middle-triangles are allocated under the same rule described above. Accordingly, the allocation rule for all the 64 phases is equivalent on every face so that a bilateral symmetry of phase allocation is observed between faces A and G as well as C and U across their common edge line, while a radial symmetry of phases appears to point out the codon-anticodon complementation between faces A and U as well as C and G around the median of their common edge line. No similar dispensation of the 21 teams is seen on the tetrahedron.

The 9 amino acid teams (AFILMPSTV) belong to a hydrophobic union, while the remaining 11 amino acid teams (CDEGHKNQRWY) are of a hydrophilic union and a new team O contain of 3 termination codons UGA (opal), UAG (amber) and UAA (orcher). The character O symbolized zero or nothing and it was derived from the first character of the traditional words ocher and opal. The 64 small-triangular phases could be transcribed preferably over the full surface of a sphere without any limitation of a tetrahedron model. Twenty-one team-colors for these 21 alphabet characters by the single-letter code are available for easy derivation of wobbling phases, e.g. by either reddish colors for the 9 hydrophobic teams or non-reddish colors for the 11 hydrophilic teams and one termination team O as follows: A (auroral), C (cyan), D (drab), E (emerald), F (fuchsin), G (green), H (heliodor), I (irish-rose), K (khaki), L (lavender), M (magenta), N (narcissus), O (opal), P (pink), Q (quercitron), R (royal-blue), S (scarlet), T (terracotta), V (violet), W (white) and Y (yellow), respectively. An intuitive grasp of the meaning of these 21 alphabet characters is extremely important for investigation and discussion of codons and/or amino acids or physico/biochemical properties of resultant peptide chain.

Although the hexaphasic 3 teams, LRS, have been allocated to their unreasonable phases in said traditional RNA table and left inconvenient for learning, they point out now a kind of linkage with their 18 phases traversed over the 3 faces A, C and U, so that the protruded 2 phases of team S run a bridging mission on face A for the tight linkage which shows a reasonable arrangement of 18 phases for learners to memorize the codon system of this invention.

There is a three-dimensional network of the tetraphasic middle-triangular 5 teams, AGPTV, resulting in a fundamental skeleton of the RNA codon system. Among them, 4 teams except team G belong to the hydrophobic union. Face A or U keeps only one tetraphasic middle-triangle, while 3 middle-triangles are apparently seen on the hydrophobic face C or G.

A major group of 9 biphasic teams, CDEFHKNQY, consists of 8 hydrophilic teams and only one hydrophobic team F. A parade of 6 longitudinal rhombuses is organized by the 6 teams, CEFHKY. Waving twin-mountains are arranged by the hydrophilic 3 teams, DNQ. Two sets of pseudo-twin-mounts protrude beyond the tetraphasic middle-triangles of the 2 hexaphasic hydrophobic teams L and S, while one pseudo-rhombus on face A is held by the other hexaphasic hydrophilic team R. There is neither slant rhombus nor irregular skew-mount at all around the tetrahedron owing to an attractive power by the union relationship.

There are 2 monophasic teams M and W. Team W stands in solitude at the bottom-left followed by triphasic termination team O on face G, while the initiation team M is enclosed by the triphasic scheme of team I to form a kind of pseudo-middle-triangle on face A. There seems to be a balance of odd-numbered group-powers in accordance with this invention, because the middle-triangular group of teams I and M is hydrophobic while another group of teams O and W as a series of double twin-mounts on face U belongs to the hydrophilic union.

EXAMPLE 2

Figure 2:
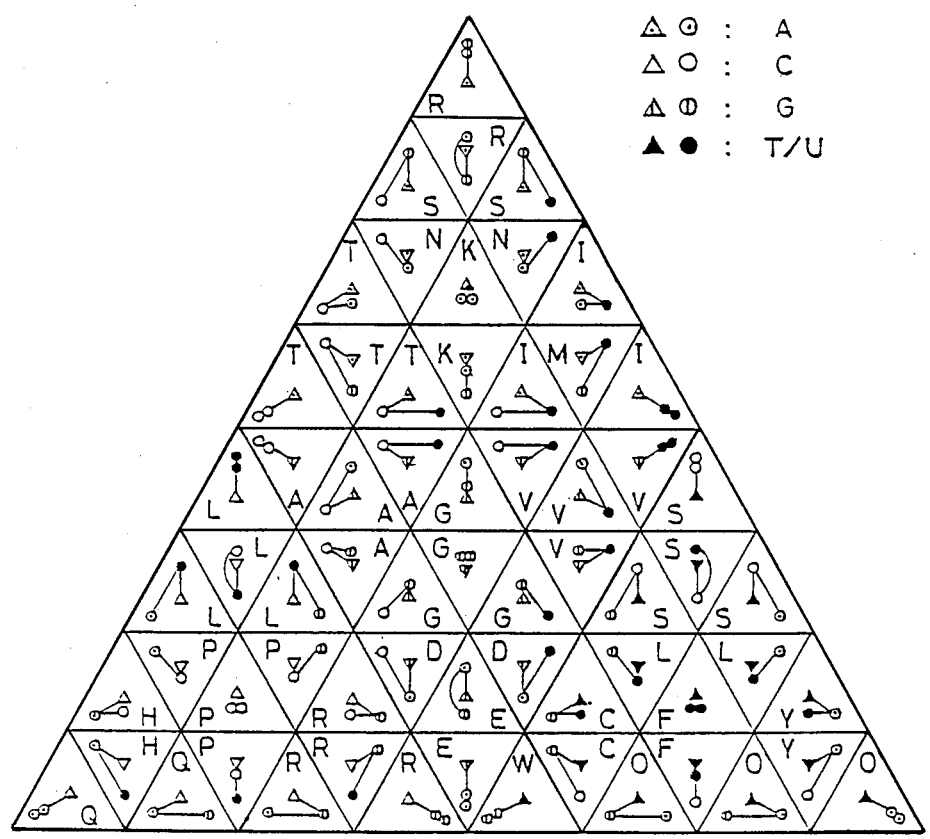

FIG. 2 shows an unfolded view of tetrahedral 4 faces of another embodiment wherein the 64 phases are represented by the both codons of DNA and RNA. All the 64 codons are represented by ideograms in lieu of alphabet characters. The corresponding L-amino acids are represented by the single-letter code as in Example 1.

The ideogram runs from the central and first triangle-mark to the second and the third circle-marks successively guided by 2 vector lines. The special ideogram, , points out the triple-letter codon such as AAA or UUU, having no vector at all. Another ideogram, , has an arc vector which represents a clockwise or counter-clockwise movement from the second nucleotide circle-mark to the third one. The clockwise vector represents an alphabetical movement such as A→G or C→T/U, while the counter-clockwise arc corresponds to a reverse alphabetical movement such as G→A or T/U→C.

This example of a center-setting represents the 4 triple-letter condons AAA, CCC, GGG and TTT/UUU in the center phases of faces A, C, G and T/U, respectively. Rules for phase allocation, middle-triangle arrangement and coloration of 21 teams are similar to those described in Example 1.

When other characteristic 4 colors are added on the ideograms for the nucleotides A, C, G and T/U, there is much convenience for learners to distinguish these nucleotides. The nucleotide colors, for example, silver, white, gold and black might be derived from the corresponding basic image such as A (silver←argent←adenosine), C (white←clear←citidine), G (gold←guanosine) or T (black←tar←thymidine), while U (uridine) could be represented in common by T.

When a commercialized codon stereo-table covered with colorless plastic is made in accordance with this example by coloration for 21 teams and 4 nucleotides, it gives the following additional advantages. Since the ideograms of this example are free from limitation of orientation inherent in alphabet characters, it is easier for learners to observe the tetrahedron in any desirable direction, e.g. in the direction to give a bird's-eye view of tetrahedral 3 faces as well as the common peak and 6 edge lines.

EXAMPLE 3

Figure 3:
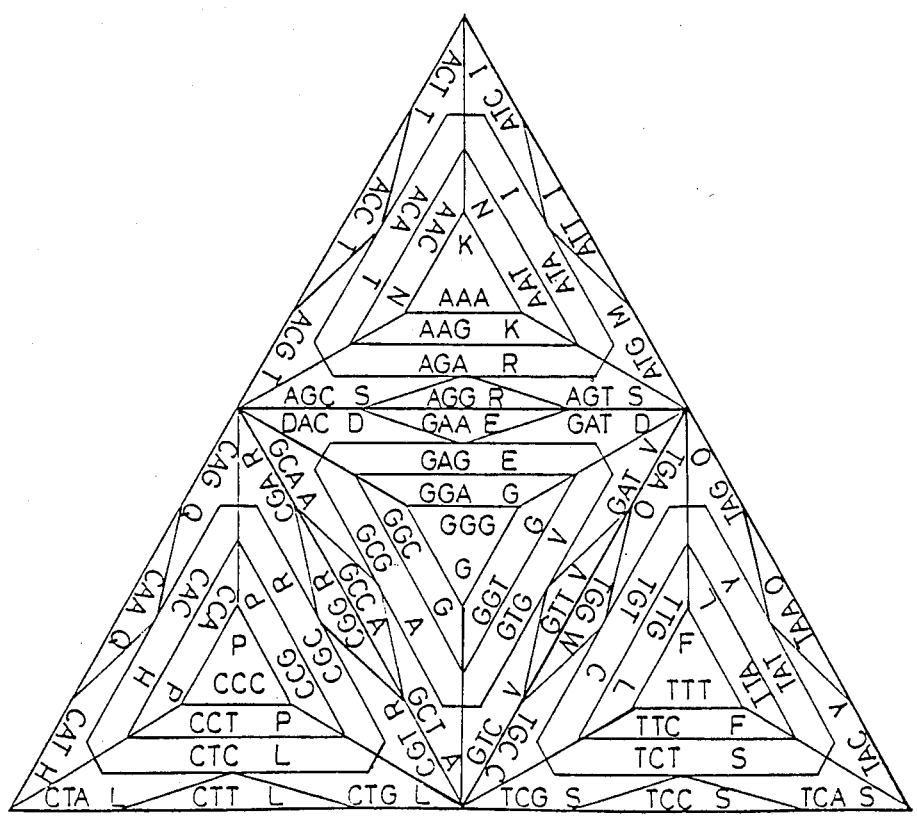
Figure 4:
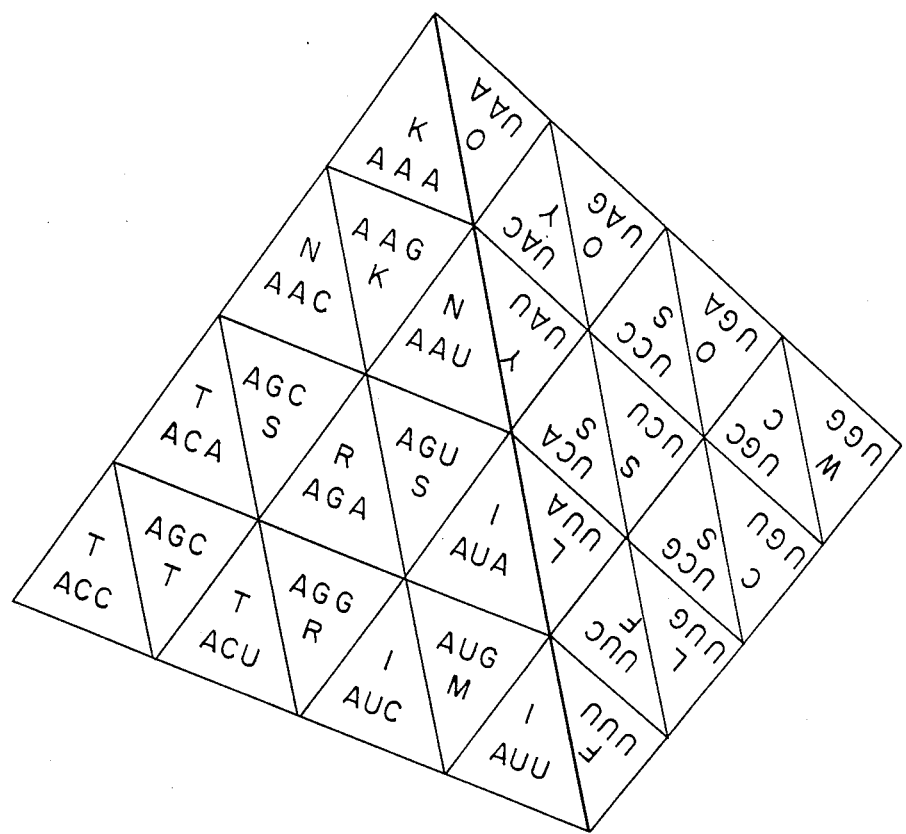
FIG. 4 is a perspective view of the stereo-table of FIG. 1 folded into a tetrahedral configuration.

FIG. 3 is an unfolded view of the tetrahedral faces of DNA codon stereo-table in a further embodiment of center-setting. The 1/16 central area of every face A, C, G or T is occupied by the respective triangular triple-letter phase, AAA, CCC, GGG or TTT, while the remaining area is divided into 15 phases with 3 equivalent sets of 5 different phasic shapes to clearly point out differences of codon functions.

In FIG. 3, alphabet characters are employed for representing the DNA codons and the corresponding 21 teams as in FIG. 1. A similar ideographical representation is also available as shown in FIG. 2 for the DNA/RNA codons. This representation allows the centralization of a larger number of the same characters e.g., (A, C, G or T) to the nearer phase of the respective triple-letter phase, AAA, CCC, GGG or TTT, and to scatter a smaller number of the nucleotide characters to the phase nearer to the respective peak region. Around each of these 4 peaks, the peripheral 6 codons each happen to cause a one-letter miscoding on their triplets, a crossover wobbling from a proper L-amino acid to another one or a carcinogenic damage to the inherited gene code.

The tetrahedral codon stereo-table of this invention as described above may be preferably made of paper, timber, glass, china, metal (for instance, aluminum or stainless steel) or thermoplastic or thermosetting synthetic resin. The dimension of 6 tetrahedral edge lines may be preferably selected from 6 to 15 cm long for personal use and 30–50 cm long in educational availability.

By observing the tetrahedral codon stereo-table made in accordance with this invention, learners can understand a theoretical relationship among the 64 DNA/RNA triplets and the corresponding 21 functional teams. In addition, learners would have a good memory of the reasonable allocation of 20 L-amino acids on the tetrahedron system in accordance with this invention.

Since understanding or learning about gene code is difficult enough with the conventional RNA Table, it is now easy due to this invention which gives learners an easy access to recognition, comprehension, deduction and envisioning of genetic engineering or biotechnology. Furthermore, the tetrahedron is available for an interior ornament or a table-top object because the whole features of the tetrahedron can be esthetically enjoyed as a kind of decorative arts.

Other common features of the tetrahedrons in accordance with this invention can be described as follows:

(a) Triple-letter phases AAA and GGG lead the hydrophilic union rich in purine nucleotides, while the hydrophobic union of pyrimidine nucleotides is guided by phases CCC and TTT/UUU.

(b) Since the new termination team O is instituted on the tetrahedron, the teams I and O are each present on the tetrahedron three times (e.g., both I and O are triphasic teams). For instance, team O contains 3 termination codons, UGA (opal), UAG (amber) and UAA (orcher).

(c) The hydrophilic union is divided into three islands by the serial hydrophobic union which starts from the twin-mounts of team S on face A and demonstrates 2 sets of octaphasic big-rhombuses on faces C and T/U. The hydrophilic union keeps only one big-rhombus on face G, consisting of its loop-forming or electro-charging 11 teams to cover only 27 phases due to the invasion by team S, while the hydrophobic union of 9 teams occupies 34 phases. These 3 big-rhombuses extend their influence over the adjacent faces and result in 3 sets of stereo-big-triangles each consisting of 16 phases. Since team O is to be classified as a latent hydrophilic team, a total of 30 phases is allocated to the hydrophilic union.

(d) In the top-setting, there is seen a perspective of two hydrophilic peaks as well as hydrophobic ones each comprising one triple-letter phase and the corresponding two double-letter phases concerning facial nucleotide character.

(e) In a special wobbling situation where the mt-RNA codons AUA of team I and UGA of team O, which are specifically produced by mitochrondria in some living cells, play an alternative role to join with the adjacent monophasic team M or W, respectively, there is one new rhombus team M for initiation and 3 sets of twin-mountains of teams I, O and W. Thus, there is no longer an odd-numbered team. Such an mt-RNA runs a simpler codon system consisting of 3 hexaphasic teams, 5 tetraphasic middle-triangles, 7 biphasic rhombuses and 6 biphasic twin-mountains.

(f) On face A of the center-setting, there is another kind of mitochondrial mission for both of the protruded t-RNA phases of team R, the pseudo-rhombus consisting of phases AGA and AGG, in order to represent a new termination team, to join with the regular termination team O and to arrange a new serial termination group across faces A and U.

(g) In Paramecium where the twin-mounts of UAA and UAG of team O represent glutamine (Q) instead of serving for the regular termination, double sets of twin-mounts (UAA-UAG/CAA-CAG) appear on faces U and C, simultaneously resulting in double sets of rhombus Q along their common edge line.

What is claimed is:

1. A three-dimensional tetrahedral stereo-table arranged for 64 DNA and/or RNA codons, which comprises a three-dimensional tetrahedron having 4 faces, each face divided by indicia into 16 codon phases, pointing out all codon triplets and corresponding 21 teams representing 20 L-amino acids and one triphasic termination team.

2. The table as claimed in claim 1, wherein said codon phases are represented by 4×16 small-triangles each having the same dimension.

3. The table as claimed in claim 1, wherein the 4 faces are labelled A, C, G, or T/U, respectively and the triple-letter codon AAA, CCC, GGG, or TTT/UUU is allocated to the top phase of face A, C, G or T/U, respectively.

4. The table as claimed in claim 1, wherein the 4 faces are labelled A, C, G, or T/U, respectively, and the triple-letter codon AAA, CCC, GGG, or TTT/UUU is allocated to the center phase of face A, C, G or T/U, respectively.

5. The table as claimed in claim 1, wherein the pointing out of all the codon triplets and the corresponding 21 teams is by the coloration of said 21 teams or said codon triplets or a combination thereof.

6. The table as claimed in claim 1, wherein said 64 triplets are represented by ideograms having no alphabetic orientation.

7. The table as claimed in claim 1, wherein said triplets are represented by colored ideograms.

8. A tetrahedral stereo-table which comprises 4 faces wherein each face is divided into 16 portions for a total of 64 portions and wherein each portion contains indicia which represents a codon triplet and a corresponding L-amino acid or termination codon so that each of 64 DNA and/or RNA codons and corresponding L-amino acids or termination codons are represented on one of said 64 portions of said tetrahedral stereo-table.

9. The table as claimed in claim 8, which is in the form of a tetrahedron.

10. The table as claimed in claim 9, wherein each edge of the tetrahedron has a length of from 6-15 cm.

11. The table as claimed in claim 9, wherein each edge of the tetrahedron has a length of 30-50 cm.

12. The table as claimed in claim 9, which is made of paper.

13. The table as claimed in claim 8, wherein each portion which contains indicia has a triangular shape.

14. The table as claimed in claim 13, wherein each triangular shape is an equilateral triangle.

* * * * *